United States Patent [19]

Smith et al.

[11] 3,933,936

[45] Jan. 20, 1976

[54] RAPID SETTING ADHESIVE COMPOUNDS

[75] Inventors: Harry A. Smith; Erwin H. Kobel, both of Midland, Mich.

[73] Assignee: The Dow Chemical Company, Midland, Mich.

[22] Filed: Feb. 20, 1973

[21] Appl. No.: 334,059

[52] U.S. Cl. .............. 260/841; 156/331; 156/335; 260/2 EN; 260/77.5 R; 260/78 R; 260/838; 428/424; 428/458
[51] Int. Cl.² .................................... C08L 63/00
[58] Field of Search ........ 260/839, 841, 838, 239 E, 260/2 EN, 78 R, 77.5 R

[56] References Cited
UNITED STATES PATENTS

| | | | |
|---|---|---|---|
| 3,115,474 | 12/1963 | Smith | 260/78 R |
| 3,115,482 | 12/1963 | Smith | 260/78 R |
| 3,461,099 | 8/1969 | Muzyczko et al. | 260/841 |

*Primary Examiner*—Murray Tillman
*Assistant Examiner*—J. Ziegler
*Attorney, Agent, or Firm*—David T. Thurston; Glwynn R. Baker

[57] ABSTRACT

Mixtures of a curable phenolic resin and an organic diaziridine are strong adhesives curable in a relatively short time at moderate temperatures to make strong bonds with wood, metal, and plastics.

11 Claims, No Drawings

RAPID SETTING ADHESIVE COMPOUNDS

BACKGROUND OF THE INVENTION

This invention concerns new and advantageous adhesive compositions which are particularly useful for bonding wood, metal, and plastics.

Phenolic-formaldehyde resins and modifications thereof have long been used as strong, water-resistant adhesives for making plywood and other bonded wood products. The curable intermediate stage resins useful in adhesive compositions comprise two general types, those basically of novolac or bisphenol kind of structure but which have reactive methylol groups on the aromatic rings, prepared by reacting a phenol with formaldehyde in the presence of an acidic condensation catalyst, and resoles, especially those having a preponderance of methylol groups in ortho relationship to a phenolic hydroxyl group, which are made by reacting a phenol with formaldehyde in the presence of a neutral or basic catalyst. Both types are curable to insoluble, infusible resins, usually by application of heat and, particularly in the case of those having a methylolated novolac structure, by reaction with additional formaldehyde.

Aziridine resins of various types are known to be good adhesives, but these also generally require heat curing at an elevated temperature.

SUMMARY OF THE INVENTION

It has now been found that the combination of a curable phenolic-formaldehyde resin as described above with about 0.5 to about 20 parts by weight of an organic diaziridine constitutes a strongly adhesive composition which cures rapidly at moderate temperatures, often at room temperature. Any novolac or resole made by reacting formaldehyde in the presence of a basic, neutral, or acidic condensation catalyst with a monohydric or dihydric phenol having at least two of the aromatic ring positions ortho or para to a phenolic hydroxyl group unsubstituted and capable of reaction with formaldehyde can be used as the phenolic resin component. Such resins modified by further reaction with one or more aromatic amines can also be used.

Diaziridines suitable for use in the adhesive composition have the general formula

where R is an organic dicarbamoyl or a bis(carbamoyloxyalkylene) radical with can be represented by the formula

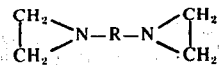

wherein $m$ is zero or one, $n$ is two or three, and R' is an alkylene radical of 2–10 carbon atoms, an arylene hydrocarbon radical of 6–14 carbon atoms, or the residue of the compound obtained by the reaction of two moles of an aromatic or aliphatic diisocyanate with a diol, the diol being ethylene glycol, propylene glycol, a corresponding polyglycol of molecular weight up to about 1000, Bisphenol A, or the adduct of Bisphenol A with two to about 20 moles of ethylene oxide or propylene oxide.

DETAILED DESCRIPTION

The diaziridine component is preferably the product of reaction of ethylenimine or an aziridinyl alkanol of the formula

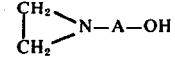

wherein A is an alkylene radical of 2–3 carbon atoms with an organic diisocyanate such as used in making polyurethane resins. Thus, where ethylenimine is used, the diaziridine product is a dicarbamide and when 1-aziridine ethanol is reacted with a diisocyanate, the diaziridine produced is a bis(aziridinylethyl) dicarbamate. Diisocyanates preferred as intermediates for making such diaziridines are aliphatic and aromatic hydrocarbon diisocyanates such as hexamethylene diisocyanate, phenylene diisocyanate, naphthalene diisocyanate, tolylene diisocyanate, and bitolylene diisocyanate; diisocyanates produced by reacting an alkylene glycol or polyglycol with such a diisocyanate, see U.S. Pat. No. 3,245,827 and U.S. Pat. No. 3,260,687; and similar diisocyanates derived from a bisphenol or the alkylene oxide adduct of a bisphenol, preferably Bisphenol A.

Substantially any resole or alkylolated novolac type of curable resin produced by reacting phenol with up to about 2.5 mole equivalents of aldehyde in the presence of an acidic, basic, or essentially neutral catalyst can be used as the phenolic resin component. The term "essentially neutral catalyst" is used to define those catalysts whose water solutions have a pH of about 4–7, for example, divalent metal salts of weak organic acids. These catalysts are generally ortho-directing in their effect. Typical examples are calcium acetate, zinc benzoate, manganese acetate, and similar salts of magnesium, cadmium, and ferrous iron. Basic catalysts include the alkali and alkaline metal oxides and hydroxides and also organic bases such as amines. Acidic catalysts include inorganic and organic acids conventionally used to make phenol-formaldehyde condensation products, for example, hydrochloric acid, sulfuric acid, phosphoric acid, and organic acids such as oxalic acid, p-toluenesulfonic acid, methanesulfonic acid and trichloroacetic acid. Phenol, a substituted phenol, or a mixture thereof is useful as the phenol reactant in making the intermediate resin. Substituted phenols having at least two of the positions ortho and para to the phenolic hydroxyl group unsubstituted and capable of reaction with an aldehyde are suitable. Examples of these include lower alkyl substituted phenols such as p-tert-butylphenol and m-cresol, and polyhydric phenols such as resorcinol, hydroquinone, pyrocatechol, and bisphenols.

A preferred resole is obtained by reacting phenol with about 0.5–2.5 moles of formaldehyde in the presence of a neutral or basic catalyst while a preferred methylolated novolac is obtained by reacting about 0.5–1.1 moles of phenol with formaldehyde in the presence of an acidic catalyst. Such modified novolacs have the characteristics of both resoles and novolacs, i.e., they have molecular structures containing substantial proportions of the reactive methylol groups typical of resoles on the basic bisphenol structure of true novolacs.

Intermediate phenolic resins of particular interest are those prepared by reacting a resole or a methylolated novolac as previously described at about 50°C. to the boiling point of the mixture with one or more of aniline, ar-(lower alkyl)aniline, and ar-(lower alkoxy)aniline, for example, toluidine or anisidine, or a difunctional arylamine such as m-hydroxyaniline, methylenedianiline, oxydianiline, or phenylenediamine. The intermediate resin can also be reacted with a combination of amines of both these classes. Total amine reactants should be about 0.05-0.5 g. mole, preferably 0.25-0.45 g. mole per 100 g. of phenolic resin. Where the intermediate resin is a methylolated novolac, of course, it is assumed that there is a sufficient number of reactive methylol groups in the modified novolac molecule to enable reaction with the aromatic amine. In one embodiment, these reactive groups can be incorporated as needed by an additional reaction step wherein formaldehyde is condensed with a conventional novolac.

The terms "weight of phenolic resin" or "parts by weight of resin" as used above and in the claims in defining proportions refer to the weight of the reaction mixture obtained by reacting formaldehyde and the phenol in the presence of a small amount of catalyst and a minor amount of water. Such reaction mixtures are normally used as such and typically they contain about 90% by weight of resin solids.

The adhesive compositions described herein are particularly valuable for bonding wood, in which application they provide strong, water-resistant bonds which are rapidly cured at moderate temperatures. They are also effective adhesives for bonding metal, ceramic materials and various plastics.

EXAMPLE 1

A resole with a high proportion of ortho substitution was prepared by reacting phenol with aqueous formaldehyde in 1:2.2 molar proportions at reflux temperature in the presence of 1% by weight of calcium acetate as the condensing catalyst. A portion of 1.17 g. of the resulting resole resin reaction product was mixed wtih 2.18 g. of the diaziridine prepared by adding two moles of ethylenimine to a urethane prepolymer (the reaction product of excess tolylene diisocyanate and polypropylene glycol of 300 average molecular weight) and the mixture was placed between two pieces of chromic acid-etched 0.063 inch sheet aluminum 1 by 5 inches in size. The bonded pieces were cured at 125°C. for five minutes. The lap shear adhesion of the cured bond was 1600 p.s.i. as determined by ASTM D 1002-64 test procedure.

Similar experiments using the phenolic resole or the aziridine compound alone or the aziridine in combination with a bisphenol A based epoxy resin showed little or no adhesion because no cure was obtained under these conditions.

EXAMPLES 2-3

The procedure of Example 1 was repeated using a resorcinol-formaldehyde resin (1.18:1 molar ratio) in place of the phenol-formaldehyde resole and two other diaziridines in different proportions. An experiment was also run using a 1:72 ratio of resin to diaziridine to show the effect of operating outside the proportions of this invention. These mixtures gelled and cured at room temperature as shown in Table 1.

Table 1

| Diaziridine | Weight Ratio Resin:Diaziridine | Gel Time | Cure Time |
| --- | --- | --- | --- |
| A | 1:1 | 26 min. | 7 hrs. |
| B | 1:1 | 30 sec. | 30 sec. |
| B | 1:2 | 30 sec. | 30 sec. |
| B | 1:3.3 | 2 min. | ca.12 hrs. |
| B | 1:9 | 30 min. | 24 hrs. |
| B | 1:18 | 130 min. | 24 hrs. |
| B | 1:72 | 82 hrs. | — |

A- Adduct of two moles of ethylenimine to the reaction product of dipropylene glycol and tolylene diisocyanate
B- Bis(2-aziridinylethyl)ester of 2,2,4-trimethyl-1,6-hexane dicarbamic acid The above mixtures when cured provided strong bonds for wood and moderately strong bonds for metals and reinforced plastics.

EXAMPLES 4-12

The procedure of Example 1 was repeated using an aromatic amine-modified phenolic resin combined with a number of different diaziridines in equal proportions by weight. The modified phenolic resin was made by reacting a resole with m-hydroxyaniline and aniline as follows.

A predominantly ortho substituted resole was first prepared by refluxing for about two hours a mixture of phenol and formaldehyde, mole ratio about 1.18:1, about 10% of water, and about 1% calcium acetate monohydrate, both based on the weight of reaction mixture. A mixture of 10 parts by weight of this reaction product and 1.42 parts of aniline was stirred at reflux temperature for 2 hours, then 1.67 parts of m-hydroxyaniline was added and refluxing was continued for another hour.

The gel times at room temperature for mixtures of this resin product with an equal weight of various aziridine compounds are listed in Table 2. All of these mixtures made strong bonds to wood and moderately strong bonds to reinforced plastics.

Table 2

| Aziridine | Gel Time |
| --- | --- |
| C | 10 min. |
| D | 13 min. |
| E | 13 min. |
| F | 20 min. |
| G | 6 min. |
| H | 9 min. |
| I | 24 min. |
| J | 17 min. |
| K | 17 min. |

C, D, E- Adduct of two moles of ethylenimine to the reaction product of tolylene diisocyanate and dipropylene glycol, tripropylene glycol, and polypropylene glycol of about 360 average molecular weight respectively.
F, G- Bis(2-aziridinylethyl)esters corresponding to C and E respectively.
H- Adduct of two moles ethylenimine to the reaction product of tolylene diisocyanate with the Bisphenol A adduct of 6 moles of propylene oxide.
I- Same as H except 6 moles of ethylene oxide added to the Bisphenol A starting material.
J- Bis(2-aziridinylethyl)ester corresponding to H.
K- Bis(2-aziridinylethyl)ester corresponding to I.

We claim:

1. An adhesive composition comprising a curable phenolic-formaldehyde resin and from about 0.5 to about 20 parts by weight of an organic diaziridine, wherein said phenolic-formaldehyde resin is a novolac or a resole obtained by reacting formaldehyde with a monohydric or dihydric phenol or mixture thereof having at least two aromatic ring positions ortho or para to a phenolic hydroxyl group unsubstituted and capable of reaction with formaldehyde in the presence of a basic, neutral, or acidic condensation catalyst wherein said diaziridine has the formula

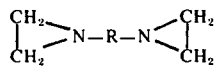

and R is a radical represented by the formula

wherein $m$ is zero or one, $n$ is two or three, and R' is an alkylene radical of 2–10 carbon atoms, an arylene hydrocarbon radical or 6–14 carbon atoms, or the residue of the compound obtained by the reaction of two moles of an aromatic or aliphatic diisocyanate with a diol, the diol being ethylene glycol, propylene glycol, a corresponding polyglycol or molecular weight up to about 1000, Bisphenol A, or the adduct of Bisphenol A with two to about 20 moles of ethylene oxide or propylene oxide.

2. The composition of claim 1 wherein the diaziridine is defined by the formula when R' is the residue of the compound obtained by the reaction of two moles of aromatic hydrocarbon diisocyanate with a mole of an alkylene glycol or polyalkylene glycol of molecular weight up to about 1000 wherein the term alkylene is defined as ethylene or propylene and wherein $m$ is zero.

3. The composition of claim 2 wherein the phenolic resin is obtained by reacting phenol with about 0.5–2.5 moles of formaldehyde in the presence of an essentially neutral catalyst.

4. The composition of claim 3 wherein the phenolic resin is first modified by reacting it at about 50°C. to about the boiling point of the reaction mixture with about 0.05–0.5 g. mole per 100 g. of resin of at least one aromatic amine of the group consisting of aniline, ar-(lower alkyl)aniline, ar-(lower alkoxy)aniline, m-hydroxyaniline, phenylenediamine, oxydianiline, and methylene dianiline.

5. The composition of claim 4 wherein the phenolic resin has been modified by reaction with aniline and m-hydroxyaniline and R' in the diaziridine formula is the residue of the product of reaction of two moles of tolylene diisocyanate with a mole of propylene glycol or polypropylene glycol of molecular weight up to about 1000.

6. The composition of claim 5 wherein the glycol reactant is polypropylene glycol with an average molecular weight of about 360.

7. The composition of claim 2 wherein the phenolic resin is a resorcinol-formaldehyde resin.

8. The composition of claim 1 wherein the diaziridine is defined by the formula when R' is the residue of the compound obtained by the reaction of two moles of aromatic hydrocarbon diisocyanate with a mole of an alkylene glycol or polyalkylene glycol or molecular weight up to about 1000 wherein the term alkylene is defined as ethylene or propylene and wherein $m$ is one and $n$ is two.

9. The composition of claim 8 wherein the phenolic resin is obtained by reacting phenol with about 0.5–2.5 moles of formaldehyde in the presence of an essentially neutral catalyst.

10. The composition of claim 9 wherein the phenolic resin is first modified by reacting it at about 50°C. to about the boiling point of the reaction mixture with about 0.05–0.5 g. mole per 100 g. of resin of at least one aromatic amine of the group consisting of aniline, ar-(lower alkyl)aniline, ar-(lower alkoxy)aniline, m-hydroxyaniline, phenylenediamine, oxydianiline and methylene dianiline.

11. The composition of claim 8 wherein the phenolic resin is a resorcinol-formaldehyde resin.

* * * * *

UNITED STATES PATENT AND TRADEMARK OFFICE
CERTIFICATE OF CORRECTION

PATENT NO. : 3,933,936
DATED : January 20, 1976
INVENTOR(S) : Harry A. Smith; Erwin H. Kobel It is certified that error appears in the above-identified patent and that said Letters Patent are hereby corrected as shown below:

Column 1, line 54, "with" should read --which--;

Column 3, line 43 "wtih" should read --with--;

Column 5, line 19, the first "or" should read --of--;

Column 6, line 22, the second "or" should read --of--.

Signed and Sealed this twenty-second Day of June 1976

[SEAL]

Attest:

RUTH C. MASON
Attesting Officer

C. MARSHALL DANN
Commissioner of Patents and Trademarks